(12) United States Patent
Hanna et al.

(10) Patent No.: US 6,681,058 B1
(45) Date of Patent: Jan. 20, 2004

(54) METHOD AND APPARATUS FOR ESTIMATING FEATURE VALUES IN A REGION OF A SEQUENCE OF IMAGES

(75) Inventors: Keith Hanna, Princeton, NJ (US); Rakesh Kumar, Monmouth Junction, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/518,872

(22) Filed: Mar. 6, 2000

Related U.S. Application Data

(60) Provisional application No. 60/129,475, filed on Apr. 15, 1999.

(51) Int. Cl.$^7$ ................................................. G06K 9/32

(52) U.S. Cl. ....................................... 382/294; 382/170

(58) Field of Search ................................ 382/294, 295, 382/284, 275, 261, 265, 282, 170, 190; 358/464, 450; 348/412.1–416.1, 671, 672, 678

(56) References Cited

U.S. PATENT DOCUMENTS

| | | | |
|---|---|---|---|
| 5,635,982 A | * 6/1997 | Zhang et al. | 348/231 |
| 5,649,032 A | 7/1997 | Burt et al. | 382/284 |
| 5,748,775 A | * 5/1998 | Tsuchikawa et al. | 382/190 |
| 5,847,755 A | * 12/1998 | Wixson et al. | 348/149 |
| 5,872,867 A | * 2/1999 | Bergen | 382/254 |

FOREIGN PATENT DOCUMENTS

| | | |
|---|---|---|
| WO | WO9716921 | 5/1997 |
| WO | WO9821688 | 5/1998 |

OTHER PUBLICATIONS

K. Hanna and N. Okamoto, Combining Stereo and Motion Analysis for Direct Estimation of Screen Structure, IEEE Computer Society, May 1993, pp. 357–365.

K. Hanna, "Direct Multi–Resolution Estimation of EGO–Motion and Structure from Motion," IEEE Computer Society, Oct. 1991, pp. 156–162.

(List continued on next page.)

*Primary Examiner*—Yon J. Couso
(74) *Attorney, Agent, or Firm*—William J. Burke

(57) ABSTRACT

A method and apparatus are disclosed that estimate the brightness or other feature values of unchanging or slowly changing regions of an image in a sequence of video images even when the regions is obscured by objects over large portions of the video sequence. The apparatus and method generate a histogram for each image region position over a plurality of image frames in the sequence. The mode, or most frequently occurring value, of the image region as indicated by the histogram is selected as representing the unchanging portion of the image. The mode values of all of the regions are then assembled to form a composite image of the unchanging or slowly changing feature values. According to one method, the histogram is generated using a recursive filter. In order to process images that exhibit some motion from frame to frame, the images in the video sequence may be aligned before generating the histogram. If the camera produces artifacts such as variations in the image caused by an automatic gain control (AGC) function, each image in the sequence of video images may be filtered either temporally or spatially before performing the histogramming operation to remove these artifacts. To reduce processing time, the image processing may be spaced in time such that only every $n^{th}$ image is processed. Alternatively, each region of an image sequence may be processed at random irregular intervals in order to obtain the histogram. In one embodiment of the invention, the histogram is applied over relatively small groups of frames in order to generate a noise reduced image.

21 Claims, 10 Drawing Sheets

OTHER PUBLICATIONS

J. Bergen, P. Anadan, K. Hanna, and R. Hingorani, Hierarchical Model–Based Motion Estimation, pp. 1–21.

A. Pope et al.; Video Abstraction: Summarizing Video Content for Retrieval and Visualization, 1998, IEEE, pp. 915–919.

M. Irani et al.; Video Compressin Using Mosaic Representations; Signal Processing, Image Communication, NL, Elsevier Science Publishers, Amsterdam, vol. 7, No. 4, Nov. 1, 1995, pp. 529–552.

European Search Report, Jun. 13, 2001.

\* cited by examiner

METHOD AND APPARATUS FOR ESTIMATING FEATURE VALUES IN A REGION OF A SEQUENCE OF IMAGES

This application claims the benefit of U.S. Provisional Application No. 60/129,475 filed Apr. 15, 1999, entitled ROBUST ESTIMATION OF THE BRIGHTNESS OR FEATURE VALUES IN A REGION IN A SEQUENCE OF IMAGES, the contents of which are incorporated herein by reference.

BACKGROUND OF THE INVENTION

The present invention concerns image processing methods and apparatus and, in particular, a method and apparatus for processing a sequence of images to recover images of unchanging portions of the scene that are partially obscured by moving objects in the scene.

There are many applications in which it is desirable to identify unchanging portions of a sequence of video images. These include data compression systems, surveillance systems and image compositing systems. The unchanging portions of a sequence of images represents redundant information in all of the images except for the first image in which they appear. Sequences of video images often include a considerable amount of redundant temporal information. For example, in a television news broadcast the background and even much of the news announcer remains substantially the same from frame to frame. In a video surveillance system, the image is substantially the same from frame-to-frame except for possible intruders.

This temporal redundancy may be used to advantage when processing a sequence of images. For example, in image data compression systems, if the static portions of a sequence of images can be identified, they may be transmitted separately from the changing portions of the image, thus reducing the total bandwidth needed to transmit the sequence of images. In a surveillance system, the unchanging portions of the image may be subtracted from newly received images to provide an output image that contains only the inconsistencies in the newly received images with respect to the preceding background images.

Depending on the application, however, it may be difficult to identify the unchanging or background portions of the sequence of images. This difficulty occurs when foreground objects frequently obscure portions of the background image. One example of such in application is a traffic monitoring system. An exemplary system of this type may produce an image such as the one shown in FIG. 1. The image includes three automobiles 110, 112, and 114 travelling along a road 116. In order to monitor the traffic flow within the field of view of the image 100, it is desirable for the traffic monitoring system to recover an image of the road 116 without the cars 110, 112, and 114. The image of the road 116 is not constant, it changes over the course of the day, for example, with changes in solar illumination. Although the traffic monitoring system may need to obtain an image of the road in the absence of the automobiles, this may be difficult to do, especially if the road is very heavily traveled, as the image of the road will be visible only between the times that the cars are visible.

One solution to this problem is to pre-store images of the road surface corresponding to different times of day and different weather conditions. This method, however, is subject to error in the selection of the appropriate background image and may require the storage of a relatively large number of images in order to cover all times of day in all seasons of the year.

SUMMARY OF THE INVENTION

The present invention is embodied in a method and apparatus which robustly estimates the brightness or other feature values of an image region in a sequence of video images even when the region is obscured by objects over large portions of the video sequence. In accordance with the present invention, a histogram is generated for each image region over a plurality of image frames in the sequence. The mode, or most frequently occurring value, of each region as indicated by the histogram is selected as representing the unchanging portion of the image. The mode values of all of the pixels in the regions are then assembled to form a background image.

According to one aspect of the invention, the histogram is generated using a recursive filter.

According to another aspect of the invention, the images in the video sequence are aligned before generating the histogram.

According to another aspect of the invention, each image frame is filtered prior to the histogramming operation to remove image artifacts caused by the camera.

According to yet another aspect of the invention, the region of the image is processed at regular intervals, skipping interstitial frames, in order to obtain the histogram.

According to yet another aspect of the invention, the region of the image is processed at random irregular intervals in order to obtain the histogram.

According to yet another aspect of the invention, the histogram is applied over a small number of frames in order to generate a noise reduced image.

BRIEF DESCRIPTION OF THE DRAWINGS

FIG. 10 is a flowchart diagram of an first exemplary noise reduction system that may be used with the embodiment of the invention shown in FIG. 9.

DETAILED DESCRIPTION

The present invention is described in terms of a background image recovery system. In the following description, the term "background" is used to denote any portion of the image that does not change from frame to frame or changes only slowly, whether that portion of the image is in the image foreground or background. In addition, the present invention is described in terms of the brightness or intensity of the picture elements (pixels) in the image. It is contemplated, however, that it may be practiced with other feature values such as color, contrast or focus. Furthermore, the exemplary embodiments of the invention described below operate on individual image pixels. It is contemplated, however, that larger (multi-pixel groups) or smaller (single-color sub-pixels) may be used depending on the selected feature value.

Figure 1:
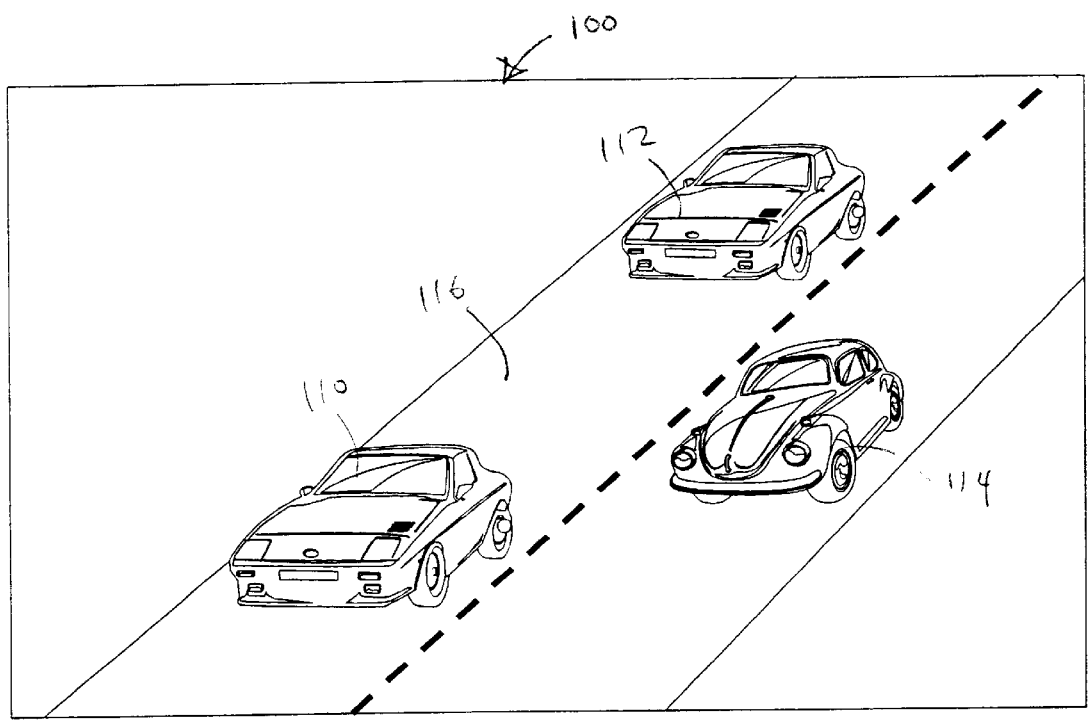
FIG. 1 is a diagram of an image obtained by a traffic monitoring system.
Figure 2:
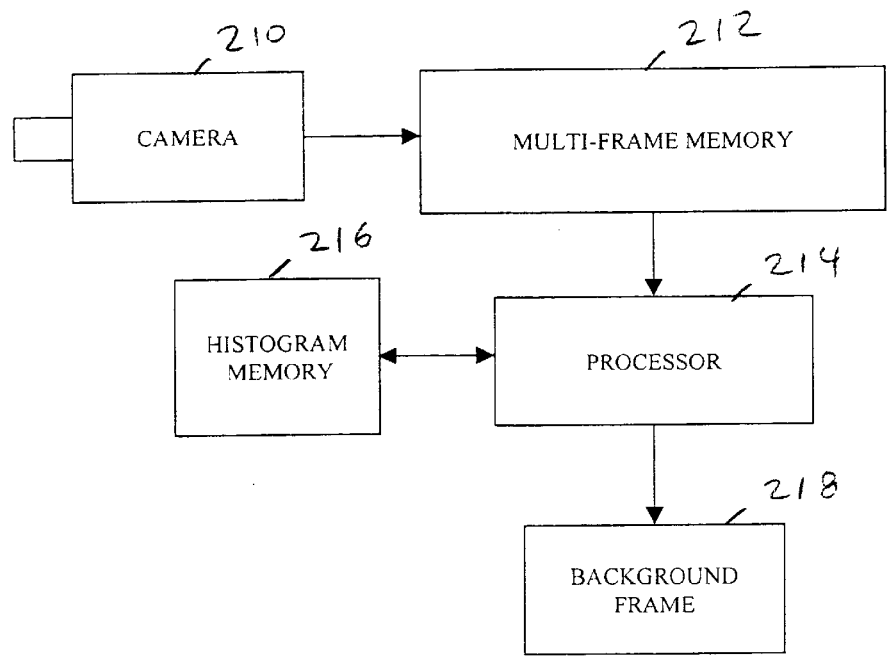
FIG. 2 is a block diagram of a first embodiment of an image processing system according to the present invention.

FIG. 2 is a block diagram of an exemplary image processing system according to the present invention. In FIG. 2, camera 210 captures a sequence of video images and stores them into a multi-frame memory 212. A processor 214 analyzes the image data held in the multi-frame memory 212 to generate a histogram at each pixel position of the image sequence and to store the histogram in a histogram memory 216. Processor 214 then determines the mode or most frequently occurring value for each pixel in the multi-frame memory 212 by analyzing the data stored in the histogram memory 216. The mode value for each pixel is transferred to the background frame memory 218 as the background image. For an image sequence, including the image shown in FIG. 1, the background image would include an image of the road 116 without the automobiles 110, 112, and 114 even though every image in the sequence includes at least automobile on the road surface 116.

One disadvantage of the system shown in FIG. 2 is the size of the multi-frame memory 212. If the camera 210 is a standard camcorder camera then, for the embodiment of the invention shown in FIG. 2 to capture and analyze even one second of video image data, The multi-frame memory 212 would need to store thirty frames of image data. To store one minute of video image data, 1800 frames would need to be stored in the memory 212.

Figure 3:
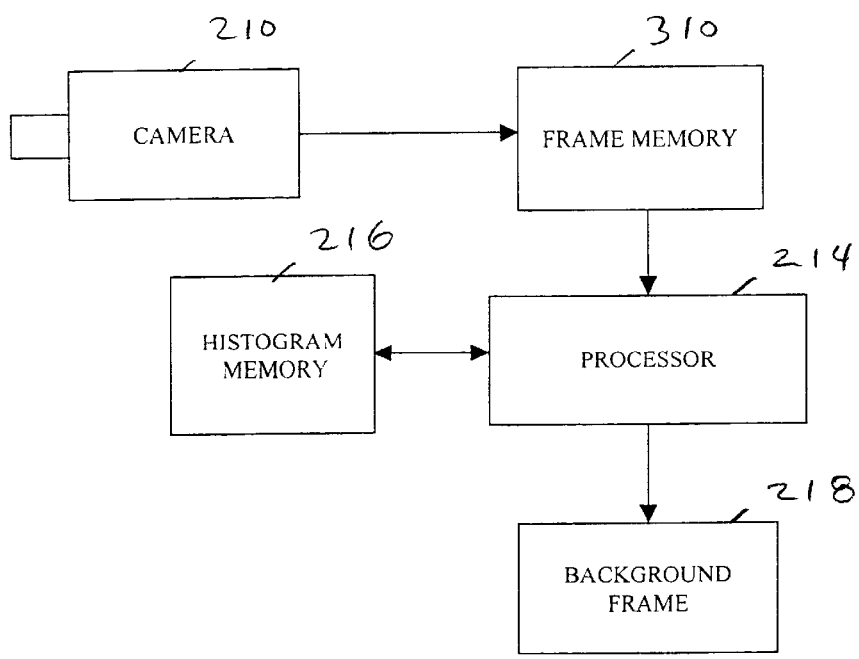
FIG. 3 is a block diagram of a second embodiment of a image processing system according to the present invention.

The embodiment of the invention shown in FIG. 3 greatly reduces the memory requirements for the subject invention by replacing the multi-frame memory 212 with a single frame memory 310. The frame memory 310 shown in FIG. 3 serves only as a buffer to store the most recently received image frame as provided by the camera 210. In FIG. 3, the histogram memory 216 is a single frame, three-dimensional memory which is indexed by the horizontal coordinate, x, the vertical coordinate, y, and by a histogram array index, I. Thus, at each pixel position (x, y) in the frame, there is a linear array having an entry for each possible pixel value. If, for example, the image size is 512 by 512 and it is desirable for the background image to have eight bits of resolution, the histogram memory 216 may have dimensions of 512×512× 256.

Many image processing applications do not require eight bits of resolution. For these applications, the size of the histogram memory 216 may be reduced by quantizing the image before calculating the histogram. In the apparatus shown in FIG. 3, the histogram memory 216 is used to hold the results of an infinite impulse response (IIR) filtering operation that implements the histogramming operation. Briefly, as each new frame is received and stored into the frame memory 310, it is processed by the processor 214 to augment values stored in the histogram memory 216. These values represent results from previously received image frames. The values stored in the memory 216 are multiplied by a weighting factor such that earlier received image frames have less weight in the histogram than later received frames.

Using the apparatus shown in FIG. 3, a histogram is calculated for an arbitrary number of image frames and the background image may be reconstructed by copying the mode of the histogram at each pixel position into the background frame memory 218.

Figure 4:
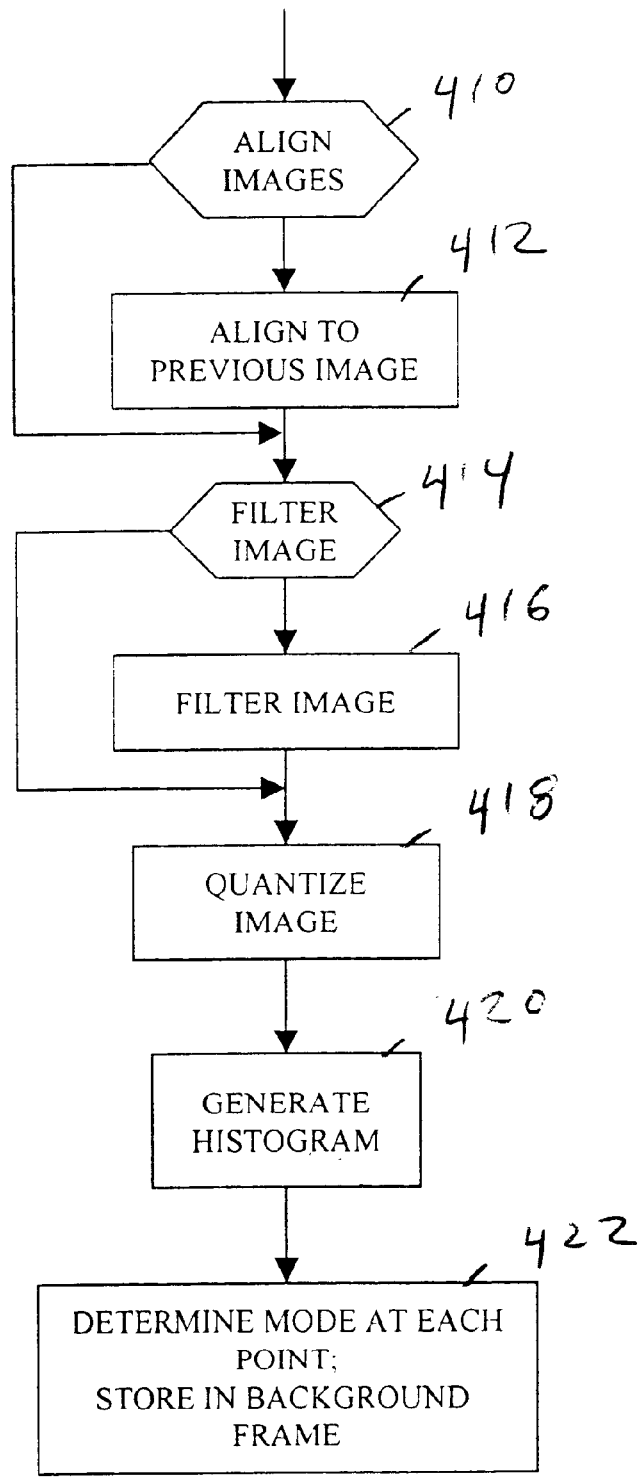
FIG. 4 is a flowchart diagram which is useful for describing the process by which the background frame is recovered in the embodiment of the invention shown in FIG. 3.

FIG. 4 is a flow-chart diagram which illustrates a process that may be performed by the processor 214 of FIG. 3 to produce the background frame 218. The first step in this process, step 410, determines whether the images need to be aligned. If the images are taken from a stationary surveillance camera they should not need to be aligned. If, however, they are taken from a camera that may exhibit even a small amount of motion from frame-to-frame, it may be desirable to align the received image frame to a previously received image frame before performing the histogramming operation. If, at step 410, it is determined that image alignment is desirable then the input image is aligned at step 412. Exemplary methods for performing image alignment by estimating image motion are disclosed in an article by K. J. Hanna entitled "Direct Multi-Resolution Estimation of Ego-Motion and Structure from Motion," *Proceedings of IEEE Workshop on Visual Motion*, pp 156–162, 1991; in an article by K. J. Hanna et al. entitled "Combining Stereo and Motion Analysis for Direct Estimation of Scene Structure," *Proceedings of the International Conference on Computer Vision*, pp 357–365, 1993; and in an article by J. R. Bergen et al. entitled "Hierarchical Model-Based Motion Estimation," *Proceedings of the Second European Conference on Computer Vision*, pp 237–252, 1992.

When image alignment is performed, the system shown in FIG. 3 may include an extra frame memory (not shown) between the frame memory 310 and the processor 214. This extra memory holds an aligned image frame. The most recently received image is aligned to the image in this extra frame memory and then replaces the aligned frame in the extra frame memory. Alternatively, the size of the histogram memory 216 may be increased by one frame and the aligned frame may be stored in the histogram memory. As another alternative, the received image frame may be aligned to the image in the background frame memory 218, and the aligned frame stored back into the input frame memory 310.

It may also be desirable to filter the image before performing the histogramming operation. At step 414 of FIG. 4, the process determines whether the image is to be filtered and, if so, at step 416 it filters the image.

Filtering may be desirable, for example, when the image sequence is obtained from a camera that includes an automatic gain control (AGC) function. The AGC function changes the amplification factor applied to the image based on instantaneous image brightness. Automatic gain control functions are typically slow acting so that they do not cause abrupt changes in image brightness. Consequently, one method that may be used to compensate for AGC is to apply a spatial high-pass filter to the image data. An exemplary filter that may be applied uses a three-tap finite impulse response (FIR) filter having coefficients of −1, 2 and −1. As the changing low-frequency image components are the same in all image directions, the high-pass filter need only be applied along one image coordinate, for example, along the horizontal coordinate. In the apparatus shown in FIG. 3, this filtering operation may be performed by the processor 214 on the image data held in the frame memory 310.

If the background image recovery system shown in FIG. 3 is used in an image compression system, the filtering operation performed at step 416 may be a basis function for a compression algorithm such as that disclosed in an article by P. Burt entitled "Multi-Resolution Techniques for Image Representation, Analysis and 'Smart' Transmission," *SPIE Conference* 1199: *Visual Communications and Image Processing*, 1989 or in an article by M. Irani et al. entitled "Video Compression Using Mosaic Representations," *Signal Processing: Image Communications*, vol. 7, nos. 4–6 pp 529–552, 1995.

Although the flow-chart diagram of FIG. 4 shows image alignment occurring before image filtering, it is contemplated that the order of these operations may be reversed and image filtering may occur before image alignment.

After the image has been filtered and aligned to the previous image, step 418 is executed which quantizes the image. The quantization operation reduces the number of values that a pixel can have and, so, reduces the number of elements (bins) in the third dimension (I) of the histogram memory 216. If, for example, the camera 210 provides monochrome images having eight-bits of pixel resolution, the memory requirement for the histogram memory 216 may be halved by quantizing each eight-bit value to the nearest seven-bit value and mapping the 7-bit values to span the same range as the eight-bit values. It is contemplated that the quantization step 418 may be merged with the latter of the alignment step 412 and filtering step 416.

After the image has been quantized at step 418, the next step in the process shown in FIG. 4, step 420, adds the image data to the histogram. One exemplary algorithm that may be used to calculate the histogram using the apparatus shown in FIG. 3 is given in the following Table.

TABLE

```
For (y=0;y<max_y;y++) {
For (x=0;x<max_x;x++) {
For (I=0;I<max_feature_value;I++) {
If (I==quantized_feature_value(x,y,t)) {
Present = 1;
}
else {
Present = 0;
}
if (not_in_region_information(x,y,t)!=1) {
hist[x,y,I] = alpha * hist[x,y,I] + (1-alpha)* Present;
}
}
}
}
```

In this table, the array hist is the histogram memory 216, shown in FIG. 3. In the program segment shown in the Table, the variables quantized_feature_value and not_in_region_information are functions of x, y and t. The values x and y correspond to the pixel position and the value t designates the current image in the sequence of images. The variable quantized_feature_value is incremented from zero to max_feature_value, the largest feature value that the pixel may have. The function not_in_region_information is described below with reference to FIG. 6.

The histogram memory 216 has a size given by max_x*max_y*max_feature_value. As described above, the value of max_feature_value is reduced by step 418 which quantizes the image.

Figure 5:
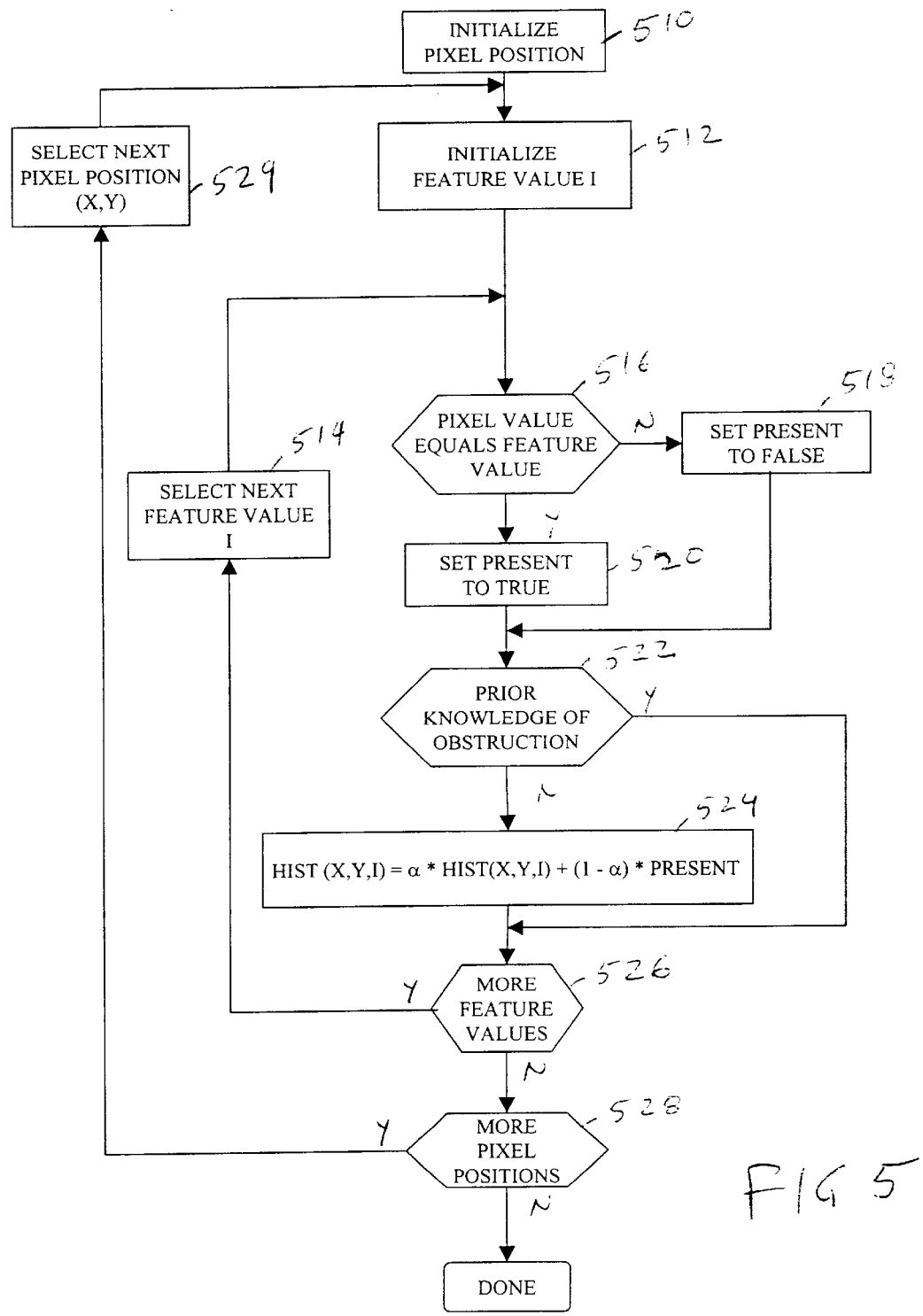
FIG. 5 is a flowchart diagram which is useful for describing the histogramming operation shown in FIG. 4.

FIG. 5 is a flow-chart diagram that illustrates the method shown in the Table. The first step 510 of the method shown in FIG. 5 initializes the pixel position in the (x, y) coordinate system. As shown in the table, the first pixel position is (0,0) and the last pixel position is (max_x, max_y). Step 512 initializes the feature value, I, of the pixel. As described above, the feature value I is incremented through every possible value that a pixel may have. In the exemplary embodiment of the invention, step 512 sets the initial value of I to zero.

Next, at step 516, the process shown in FIG. 5 determines if the pixel at position (x, y) of the input image has the current feature value as its pixel value. If not, then, at step 518, the value of a variable, PRESENT is set to zero. Otherwise, at step 520, the value of the variable PRESENT is set to one. Next, at step 522, the process determines if the pixel is in a portion of the current image in that is known to be obstructed. In the exemplary embodiment of the invention, step 522 receives the current values of the coordinates x and y and returns a Boolean value if there is a known obstruction at that pixel position. The process for determining whether an obstruction exists is described below with reference to FIG. 6.

If, at step 522, there is no prior knowledge of an obstruction at the target pixel position, then control transfers to step 524 in which the histogram entry for the current feature value at the current pixel position is updated. The rule for updating the histogram entry is given by equation (1).

$$\text{HIST}(x,y,I) = \alpha * \text{HIST}(x,y,I) + (1-\alpha) * \text{PRESENT} \tag{1}$$

In this equation, α is a variable that controls the length of time over which the histogram monitors the pixel value and thus, the length of time over which the mode of the pixel is calculated. If, for example, it is expected that the region will not change over a long time period, then the value of α may be set to be very close to 1.0. A typical value may be 0.999. This may be the case for a stationary surveillance camera. If it is likely that the region will change, the value of α is desirably set such that values obtained from older frames decay and are replaced by values from newer frames more rapidly.

Equation (1) increments a value in a bin in the histogram corresponding to a feature value by (1−α) each time that the feature value is encountered at that pixel position. For each feature value that does not match the current pixel value, the value in the histogram bin is decreased by a factor of α. That is to say the new value in the histogram is α times the old value.

If there is prior knowledge of an obstruction at step 522, the algorithm skips step 524, branching directly to step 526. At step 526, the process determines if more feature values need to be processed for the current pixel position. If so, control transfers to step 514 in which the next feature value is selected and then to step 516, described above.

After all possible feature values for the current pixel position have been processed through equation (1), control transfers from step 526 to step 528 which determines if more pixel positions in the image need to be analyzed. If so, then control transfers to step 529 which selects the next pixel position and passes control to step 512, described above. Step 529 increments x until it reaches a value max_x and then resets x to zero and increments y. This process continues until a pixel position of (max_x, max_y) is encountered at step 528, at which time control transfers to step 530 and the histogramming process is complete for the current image.

Figure 6:
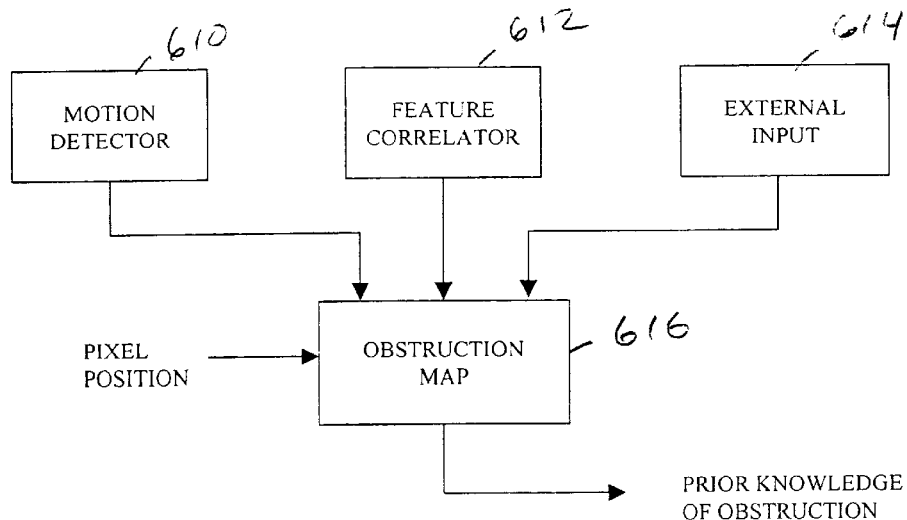
FIG. 6 is a block diagram of an exemplary system for the determining whether there is prior knowledge of obstruction during the generation of the histogram shown in FIG. 5.

FIG. 6 shows details of an exemplary process for determining whether there is prior knowledge that the background is obstructed for a pixel position in the current image. This process includes a motion detector 610, a feature detector 612 and an external input 614. It is contemplated that the prior obstruction detector may be omitted or that any one of the elements or any combination of these elements may be used in a prior obstruction detector according to the present invention.

In the exemplary embodiment of the invention, the motion detector 610 may, for example, generate an image map showing areas of the current image that differ from the corresponding areas of the previous image by more than a threshold value. With reference to FIG. 1, the motion detector 610 may be used, for example, to exclude portions of the image which are changing due to the motion of the automobiles 110, 112 and 114.

The exemplary feature correlator 612 may, for example, filter the current image to determine if a specific item is present in the image and, if so, its location. With reference to FIG. 1, this filter may be, for example, a matched filter that corresponds to the spatial characteristics of an automobile. If the filter detects an automobile at a particular image position then that position and its surrounding positions are not updated in the histogram.

The final element of the apparatus shown in FIG. 6 is the external input sensor 614. An exemplary sensor that may be used for the image shown in FIG. 1 is a stop-light sensor. If, for example, there is a stop-light on the road 116, that is outside of the field of view 100 of the camera, then, when the stop-light is red, the automobiles 110, 112 and 114 on the road are stopped. While these automobiles may be detected by the feature correlator 612, they will not be detected by the motion detector 610. When this external input sensor 614 indicates that the stop-light is red, the entire road surface may be indicated as possibly including a prior obstruction to prevent the histogramming algorithm from erroneously considering a stopped automobile as the road surface.

In the exemplary embodiment of the invention, the motion detector 610, feature correlator 612 and external input 614 all provide inputs to an obstruction map 616. The obstruction map 616 may, for example, be a bit-map of the current image where each pixel position is represented by a one-bit value. The value is set to one (true) if any of the elements 610, 612 and 614 indicates that there may be an obstruction at that pixel position. Otherwise, the value is set to zero (false). At step 522 of FIG. 5, the current pixel position (x, y) is provided to the obstruction map 616 and the one-bit value at that position is returned as a Boolean value.

Returning to FIG. 4, once the histogram has been generated at step 420, step 422 analyzes the histogram memory 216 to determine the arithmetic mode for each pixel position in the image. The mode of a frequency distribution is defined to be the most frequently occurring value. In the exemplary embodiment of the invention, this value may be determined by simply selecting the feature value I at each pixel position (x, y) corresponding to the highest value of the array HIST (x, y, I). Alternatively, the feature value corresponding to the maximum of the histogram may be calculated to sub-quantization precision by interpolating among feature values surrounding the maximum. Specifically, a linear or quadratic function may be fit to the peak and some number of adjacent values and the maximum value can be computed from the recovered function.

Finally, at step 422 of FIG. 4, when the mode at a particular pixel position has been determined, the mode value is stored at the corresponding pixel position in the background frame. When the entire image has been processed through the algorithm shown in FIGS. 4, 5 and 6, the background image holds an image of those objects in the field of view of the camera that do not change from frame to frame over the update time period defined by the value $\alpha$ of equation (1).

Even when a single frame memory, as shown in FIG. 3, is used rather than the multi-frame memory shown FIG. 2, the image processing may be quite intensive as every pixel in the region of interest is processed for every frame. It is contemplated, however, that three methods may be used to significantly reduce the computation needed to generate the background image 218. The first two methods assume that the output background image does not need to be updated at every frame interval. This is the case, for example, when the camera 120 is a stationary surveillance camera.

Using the first method, feature values for each pixel position and the Boolean not_in_region_information are stored for n (e.g. 8) frames and every $n^{th}$ frame these stored values are applied as address values to a look-up table that contains cascade-calculated values for equation (1) over the n frame intervals. This method significantly reduces the processing time but does not lose any information.

In the second method, only every $n^{th}$ image frame is used in the process shown in FIGS. 4, 5 and 6. To maintain the same time frame for the value of $\alpha$, precomputed, cascaded values for the equation (1) may be stored in a look-up table. Using this method, the histogram may be maintained by analyzing only one frame in every n frames. In an exemplary embodiment of the invention, n may be equal to 8.

A third method for reducing the amount of computation needed to produce a background image from a sequence of frames is to process only a relatively small portion of the image in any one frame. Feature values for other portions of the image are stored and provided with the updated region. One variation on this method may be to divide the picture space into regions and process those regions that exhibit higher rates of change more frequently than those regions that exhibit only infrequent change. With reference to the image shown in FIG. 1, for example, the portions of the picture space that include the road surface 116 may be updated more frequently than the regions away from the road.

Figure 7:
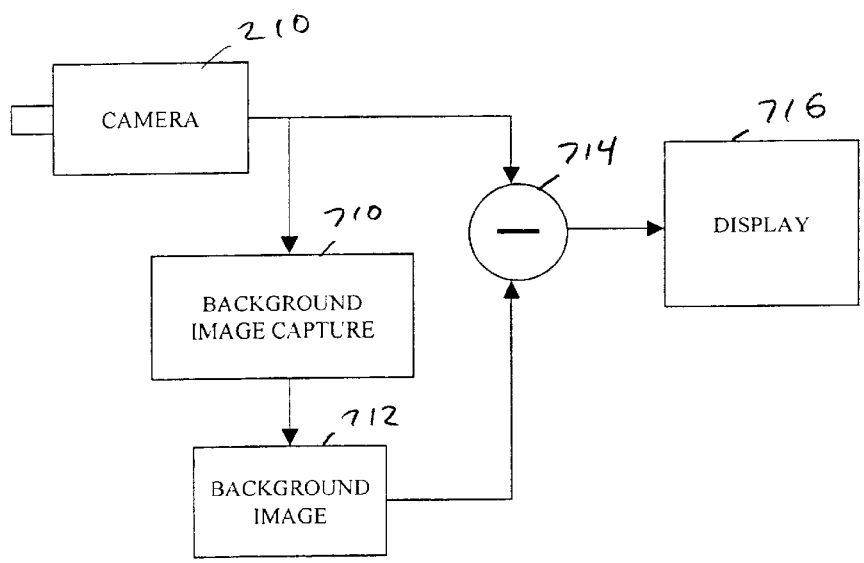
FIG. 7 is a block diagram of an exemplary surveillance system which employs the background image capture system according to the present invention.
Figure 8:
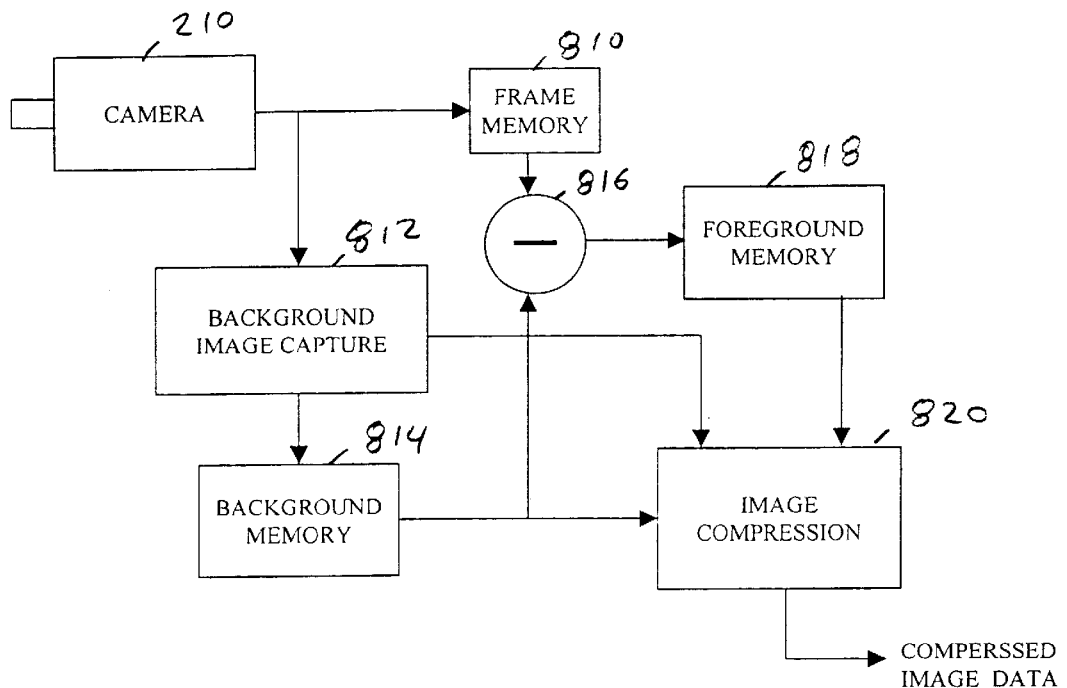
FIG. 8 is a block diagram of an image compression system which employs a background image capture system according to the present invention.

FIGS. 7 and 8 show two applications of the background image processing apparatus and method shown in FIGS. 2 through 6. FIG. 7 illustrates a surveillance system and FIG. 8, an image compression system. Both of these systems include embodiments of the invention.

In FIG. 7, a surveillance camera 210 provides a sequence of images to a background image capture system 710 such as that shown in FIG. 2 or FIG. 3. The system 710 provides the background image 712 as its output image. This image is subtracted from the image provided by the camera by a subtracter 714 and the result is displayed on a display device 716. Because the background image 714 represents the unchanging objects in the scene that is being imaged by the camera 210, only the changing or transient portions of the image sequence will appear on the display monitor 716. This process greatly reduces the amount of image data that needs to be analyzed either by a security guard or by an automated detection system.

In the embodiment of the invention shown in FIG. 7, the camera 210 is a stationary surveillance camera used in a consistently lighted environment and, as such, does not need an AGC circuit to compensate for instantaneous changes in image brightness. Consequently, the images in the image sequence are neither filtered nor aligned. If the camera 210 were to include an AGC function and the background image capture system 710 were to perform a filtering operation, then the image provided on the display device 716 would include high-frequency portions of transient objects and low-frequency portions of more slowly changing objects. This image would still be suitable for a surveillance system as the human eye is more sensitive to high spatial frequencies than to low spatial frequencies.

An alternative method for mitigating variations in the image data caused by an AGC function may be to process the input image into a pyramid representation as disclosed in U.S. Pat. No. 4,718,104 entitled FILTER-SUBTRACT-DECIMATE HIERARCHICAL PYRAMID SIGNAL ANALYZING AND SYNTHESIZING TECHNIQUE. Using this method, each input image may be represented by multiple Laplacian pyramids and a single Gaussian pyramid. The exemplary histogramming algorithm processes only the higher level (higher resolution) Laplacian pyramids. For example, the lowest level Laplacian pyramid and the Gaussian pyramid level are not processed. The value of a changes with the different pyramid levels. For example, for the lowest level Laplacian image, $\alpha$ may have a value of 0.01. For the higher pyramid levels, values of $\alpha$ close to unity may be used, for example, 0.9, 0.99 and 0.999.

FIG. 8 shows an application of the background image capture system in an image compression system. In the system shown in FIG. 8, the camera 210 sends video signals to a frame memory 810 and to a background image capture system such as that described above with reference to FIGS. 2 through 6. This system provides a continually updated background image to the background memory 814. The background memory provides the background image to a subtracter 816 and to an image compression system 820. The subtracter 816 subtracts the background image from the image held in the frame memory 810 and provides the result to a foreground image memory 818. The foreground image 820 is also provided to the image compression system 820. In addition to generating the background image, the background image capture system 812 provides a signal to the image compression system indicating when the background image has changed significantly. To determine when such a change has occurred, some global feature of the background image, for example, a sum of all of the pixel values in the image, may be monitored over several frame intervals and the differences among the successive values may be compared to a threshold. When these differences exceed the threshold, the background image capture system may signal the image compression system that the background image has undergone a significant change.

In this exemplary embodiment of the invention, the image compression system may compress and transmit the background image once while it compresses and sends several foreground images. Updated background images may be compressed and transmitted at regular intervals and/or when the background image capture system 812 indicates that there has been a significant change in the image. When the compressed signal is received, the background images is reconstructed and saved. As each compressed foreground image is received, it is combined with the currently saved background image to reconstitute the original image sequence.

Figure 9:
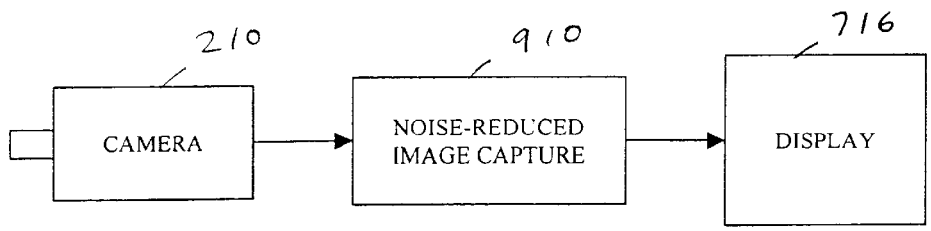
FIG. 9 is a block diagram of an image noise reduction system which employs a histogramming system according to the present invention.
Figure 1C:
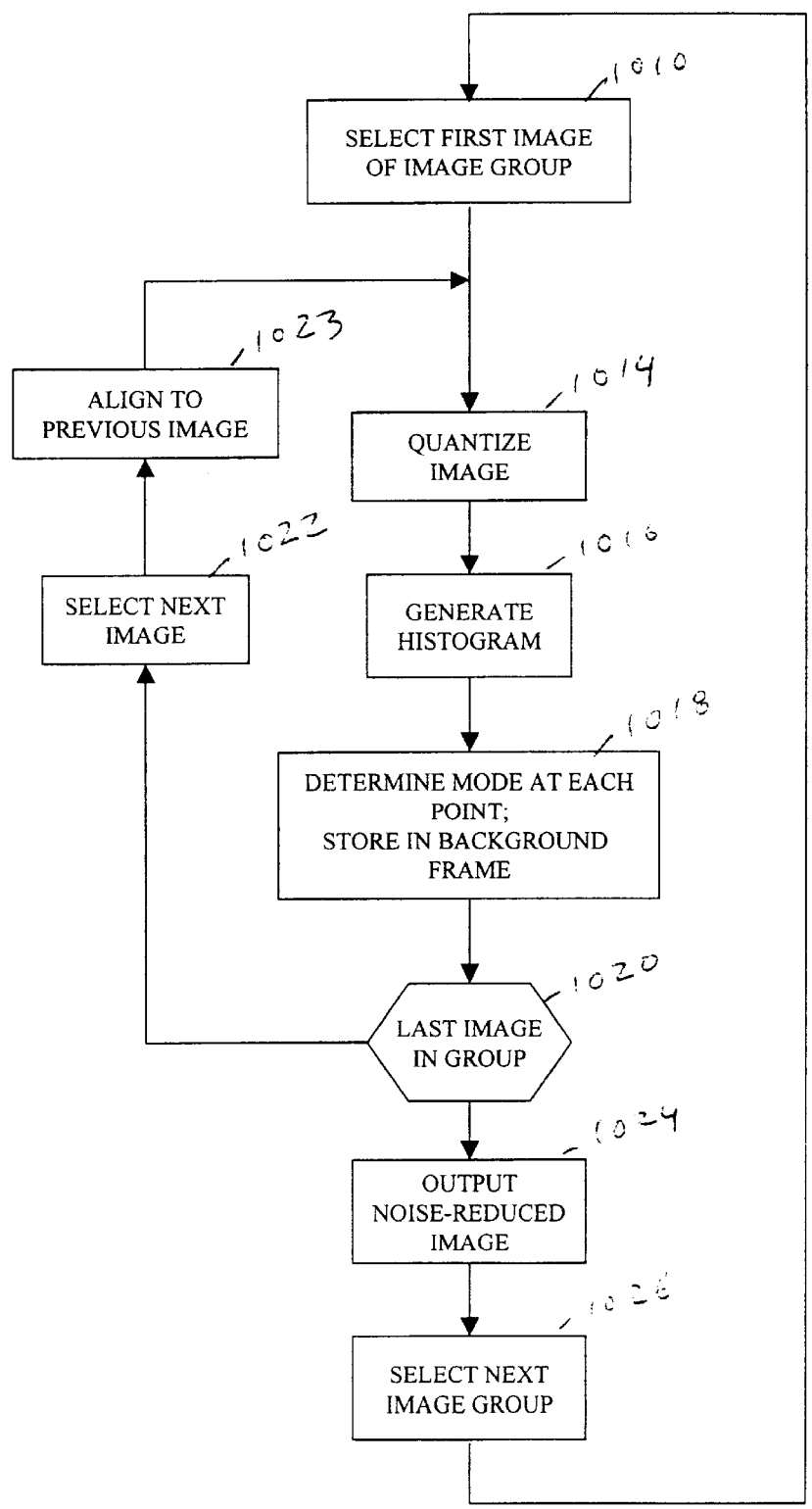

FIG. 9 is a block diagram of an image noise-reduction system that includes an embodiment of the present invention. In FIG. 9, the video camera 210 provides image data to a noise-reduced image capture system 910 which, in turn, provides a noise reduced image to the display device 716. The noise-reduced image capture system uses the same processing elements as are shown in FIG. 3 except that the background frame memory 218 is a noise-reduced frame memory. The algorithms used by the image capture system to generate the histogram and to produce the noise-reduced image from the image sequence are modified from those shown in FIGS. 4 and 5. These modified algorithms are described below with reference to FIGS. 10 and 11.

Because so few frames are used in the histogramming function of the noise reduction system, it may be desirable to implement the operation using a true histogram instead of the IIR filter. The process shown in FIGS. 10 and 11 processes frames in groups and uses a true histogram while the process shown in FIGS. 12 and 13 processes images continuously and uses an IIR filter to approximate the histogram.

The noise reduction system shown in FIG. 9 can correct zero-mean random noise in an image sequence. In addition, it can correct an annoying type of distortion that commonly occurs in consumer video tape recording machines, known as vertical tear. This image distortion is seen as a "tearing" of vertical edges in the image. The vertical edge exists in most of the images of the sequence but, in a few images, it is displaced horizontally along a short portion of the edge. The mode of the histogram generated by the noise-reduction system captures the substantially constant vertical edge and ignores the transient tears. The noise reduction system is also useful as a preprocessing step for an image compression operation. Most image compression systems compress noisy images less efficiently than relatively noise-free images. This is because noise in the image represents image differences from pixel to pixel and from frame to frame. By removing transient variations in the image, the noise reduction system shown in FIG. 9 increases the efficiency of any compression system that relies on spatial or temporal pixel redundancy.

The exemplary method processes a group of m images to produce a single output image. The process begins in FIG. 10 with the selection of the first image in the group of images at step 1010. Next, this first image is quantized at step 1014. Following step 1014, the image is processed, at step 1016, into the histogram as described below with reference to FIG. 11. Next, at step 1018, the process determines the mode of the image at each pixel position and stores the result in the noise-reduced frame memory 218. At step 1020, the process determines if there are more images in the current group of m images. If so, step 1022 is executed which selects the next image in the group and step 1023 is executed which aligns this next image to the previous image in the group. Because the algorithm aligns all of the images in each group, camera motion occurs only across group boundaries.

When, at step 1020, the last image in the group has been processed, the noise-reduced image frame is provided as an output frame. Next, at step 1026, the next group of images is selected and the process transfers control to step 1010.

Figure 11:
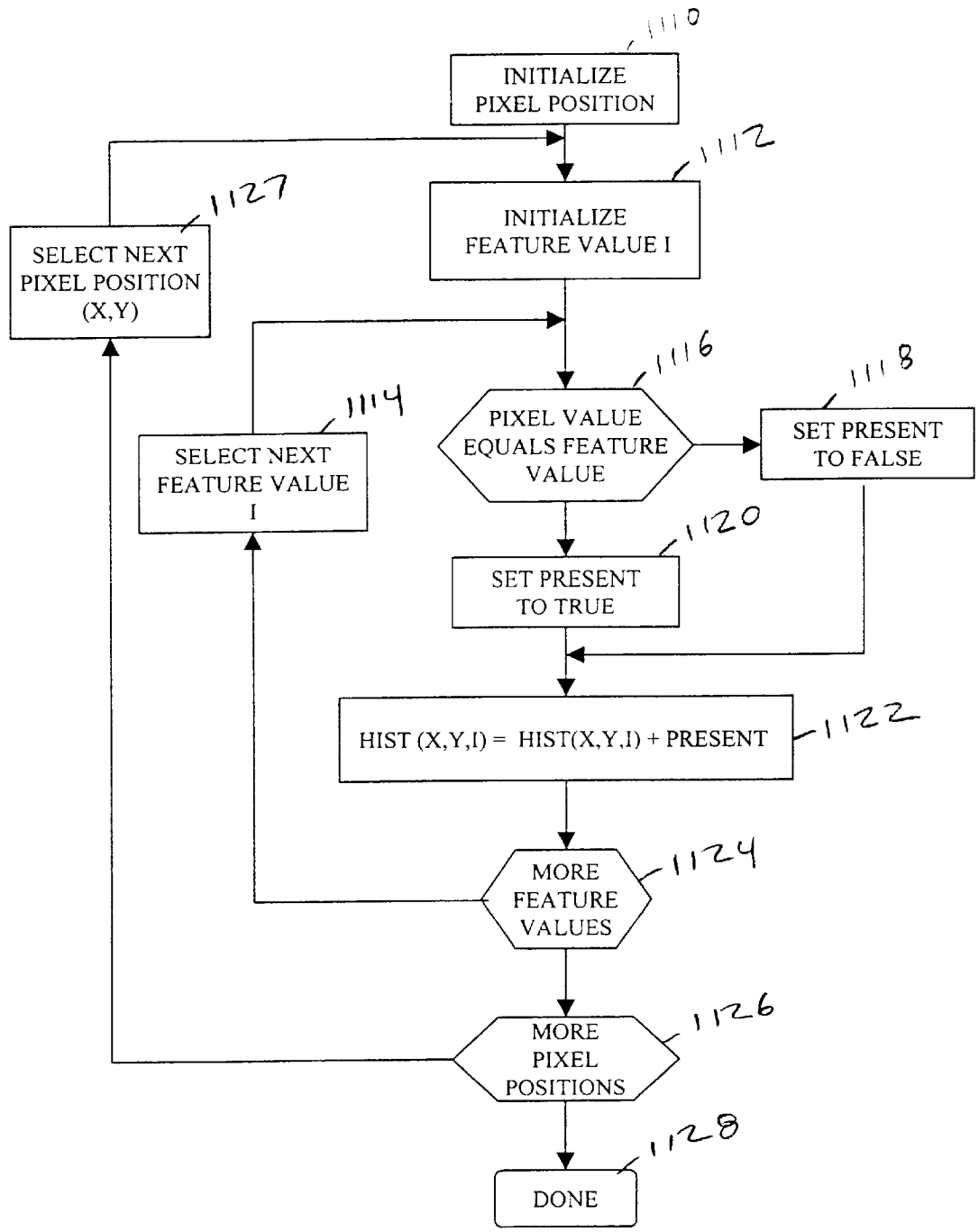
FIG. 11 is a flowchart diagram of an exemplary histogramming function that may be used with the noise reduction system shown in FIG. 10.

FIG. 11 shows an exemplary histogramming process that may be used in step 1016 of FIG. 10. The first step in this process, step 1110 initializes the pixel position for the image frame. Next at step 1112, the process initializes the feature value, I. At step 1116, the process compares the pixel value at the current pixel position to the current feature value. If these values are equal, the process sets the variable PRESENT to one, at step 1120, otherwise it sets PRESENT to have a value of zero at step 1118. Next, at step 1122, the process calculates the value of the histogram for the current feature value of the current pixel position using equation (2).

$$HIST(x,y,I) = HIST(x,y,I) + PRESENT \tag{2}$$

As described above, this equation implements a true histogram function.

Figure 13:
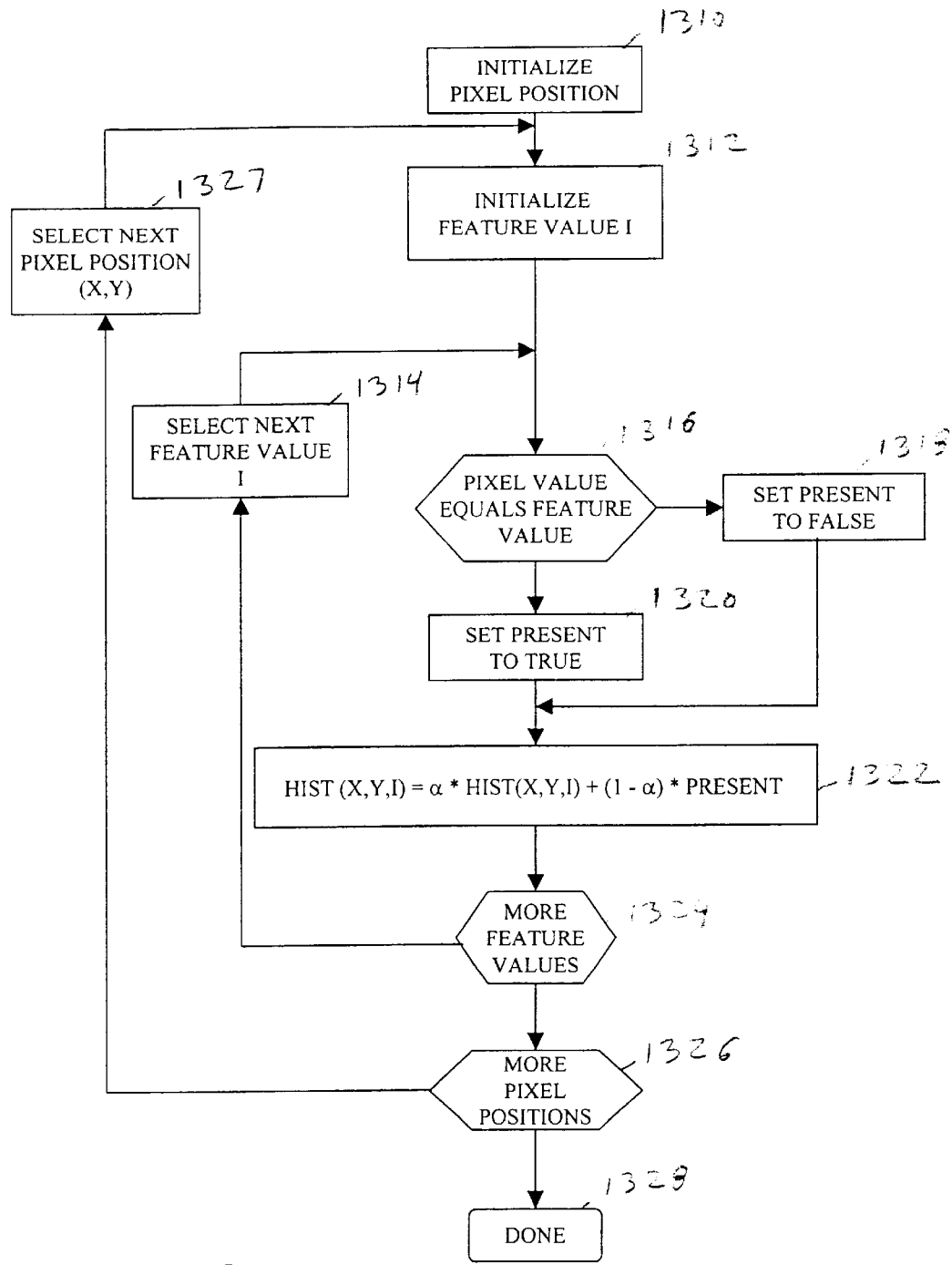
FIG. 13 is a flowchart diagram of an exemplary histogramming function that may be used with the noise reduction system shown in FIG. 12.

After step 1122, the process determines, at step 1124 if there are more feature values to process at the current pixel position. If so, control transfers to step 1114 which selects the next feature value and transfers control to step 1116, described above. When the last feature value has been processed, step 1124 transfers control to step 1126 to determine if more pixel positions in the image need to be processed. If they do, step 1126 transfers control to step 1127 which selects the next pixel position in the image and transfers control to step 1112, described above. Once all of the pixel positions in the image have been processed, step 1126 transfers control to step 1128, the end of the histogramming process. to FIGS. 13 and 14 are flow-chart diagrams for a noise reduction system that may operate continuously using an IIR filter to approximate the histogram. After this system has processed an initial relatively small number of image frames, it can produce output frames at the same rate that it receives input frames.

Figure 12:
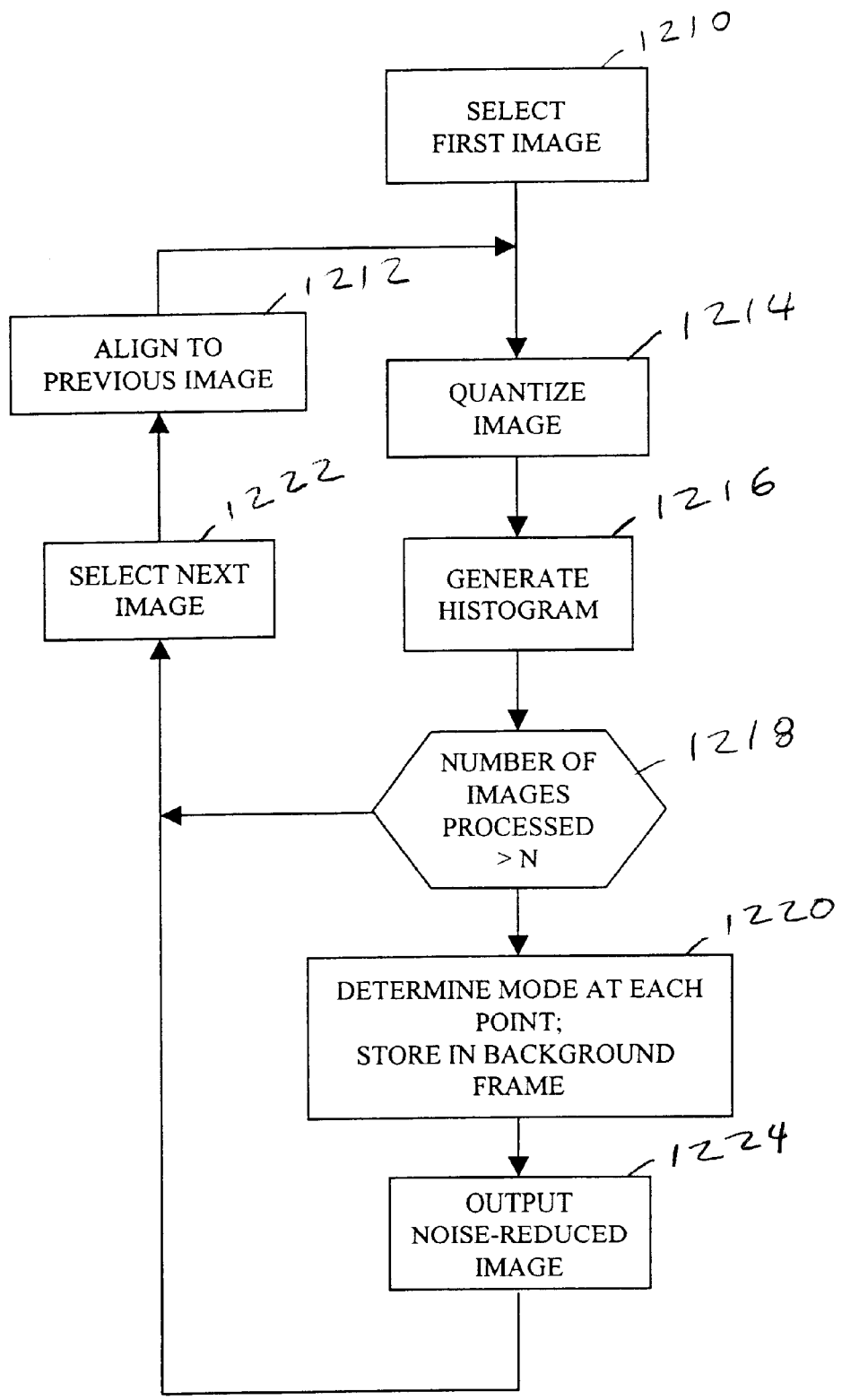
FIG. 12 is a flowchart diagram of an second exemplary noise reduction system that may be used with the embodiment of the invention shown in FIG. 9.

One difference between the background-determining algorithms shown in FIGS. 4 and 5 and the noise reduction algorithms shown in FIGS. 12 and 13 is the value of $\alpha$ that is used in equation (1). In order to maintain image continuity, the algorithms shown in FIGS. 12 and 13 use a relatively small $\alpha$, for example 0.6. This value for $\alpha$ quickly reduces the weight applied to older frames, allowing the histogram to track at least slowly changing moving portions of the image sequence as well as the unchanging background. Because of the smaller time-frame, however, fewer frames are used in the histogramming function.

This alternative noise reduction process begins at step 1210 by selecting the first image. This image is quantized as step 1214 and is passed to the histogramming process at step 1216. The histogramming process is described below with reference to FIG. 13. Step 1218 then determines if a sufficient number of image frames have been processed for the histogram to be valid. If, at step 1218, fewer than N frames have been processed, control transfers to step 1222 to select the next image frame. At step 1212, this image is aligned to the previous image and then the aligned image is quantized at step 1214, as described above.

If, however, at step 1218, N or more images have been processed, then control transfers to step 1220, which determines the mode of the histogram at each pixel position to produce a noise-reduced image and, at step 1224, provides this noise-reduced image to the display 716 (shown in FIG. 9). As the noise-reduced image is displayed, the process shown in FIG. 12 branches to step 1222 to select the next image, as described above.

FIG. 13 is a flow-chart diagram of an exemplary histogramming process that may be used in step 1216 of the noise-reduction process shown in FIG. 12. The first step in this process, step 1310 initializes the pixel position for the image frame. Next at step 1312, the process initializes the feature value, I. At step 1316, the process compares the pixel value at the current pixel position to the current feature value. If these values are equal, the process sets the variable PRESENT to one, at step 1220, otherwise it sets PRESENT to have a value of zero at step 1318. Next, at step 1322, the process calculates the value of the histogram for the current is feature value of the current pixel position using equation (1). After step 1322, the process determines, at step 1324 if there are more feature values to process at the current pixel position. If so, control transfers to step 1314 which selects the next feature value and transfers control to step 1316, described above. When the last feature value has been processed, step 1324 transfers control to step 1326 to determine if more pixel positions in the image need to be processed. If they do, step 1326 transfers control to step 1327 which selects the next pixel position in the image and transfers control to step 1312, described above. Once all of the pixel positions in the image have been processed, step 1326 transfers control to step 1328, the end of the histogramming process.

The noise-reduction process shown in FIG. 13 operates on a sequence of images that exhibits relatively little motion from frame to frame. The method may be adapted to process an image sequence that exhibits motion by retaining the alignment parameters at step 1212 and applying an inverse alignment (not shown) between steps 1220 and 1224. Even in this embodiment, if the image sequence exhibits significant amounts of motion, it may be desirable to use a relatively small value for $\alpha$ in equation (1). If, however, the image exhibits only relatively small amounts of motion which can be compensated by the image alignment process, a relatively large value of a may be used.

Although the exemplary embodiments of the invention described above sequentially step through each pixel position in the image and, thus, may be executed on a general-purpose computer, it is contemplated that the algorithms may be modified to process groups of pixels in parallel on parallel processors, for example, an array processor configured as a Single Instruction, Multiple Data (SIMD) computer (not shown). In this alternative embodiment groups of pixel positions are assigned to respective processors in the array and their histogram arrays are updated in parallel.

The present invention may be realized as a computer program which controls a general purpose computer or a special purpose computer, as described above. This program may be implemented on a carrier such as a magnetic or optical disk or a radio-frequency or audio-frequency carrier wave.

The invention has been described in terms of several exemplary embodiments. It is contemplated, however, that it may be practiced as outlined above with variations that are within the scope of the following claims.

What is claimed:

1. A method for estimating values of features of one or more image regions in a video sequence including a plurality of video image frames when the one or more of the features are obscured by objects over portions of the video sequence, the method comprising the steps of:

generating a histogram for each image region over the a plurality of image frames in the sequence;

calculating at each image region a mode value as indicated by the histogram;

replacing each image region by its mode value to produce an image of the estimated feature values of the sequence of images; and excluding, from the histogram generating step, regions of the plurality of images in which there is a prior indication that the features are obscured.

2. A method according to claim 1, further including the step of detecting motion among corresponding regions in the plurality of video image frames to provide the prior indication that the features are obscured.

3. A method for estimating values of features of one or more image regions in a video sequence including a plurality of video image frames when the one or more of the features are obscured by objects over portions of the video sequence, the method comprising the step of:

generating a histogram for each image region over the plurality of image frames in the sequence by recursively filtering each image region over the plurality of image frames to generate the histogram;

calculating at each image region a mode value indicated be the histogram; and replacing each image region by its mode values to produce an image of the estimated feature values of the sequence of images.

4. A method according to claim 3, further comprising the step of aligning the images in the video sequence before generating the histogram.

5. A method according to claim 3, further comprising the step of filtering each image frame in the video sequence before generating the histogram.

6. A method according to claim 1, wherein the image sequence includes a number of frames, F, wherein the step of generating the histogram collects statistics at each image region for each frame in every n frames of the image sequence and, using the statistics to index into a look-up table, generates the histogram for every nth image frame, where n is an integer less than F.

7. A method according to claim 1, wherein the image sequence includes number of frames, F, wherein the step of generating the histogram processes only every nth image frame in the video sequence where n is an integer less than F.

8. A method according to claim 1, wherein the step of generating the histogram processes image frames in the sequence at irregular intervals.

9. A method according to claim 1, wherein, the image sequence exhibits motion, the step of replacing each image region by its mode generates a sequence of successive estimated feature value images, and the step of generating the histogram operates over a number of frames sufficient to preserve at least a portion of the motion in the sequence of estimated feature value images.

10. A method for estimating values of features of one or more image regions in a video sequence including a plurality of video image frames when the one or more of the features are obscured by objects over portions of the video sequence, the method comprising the steps of:
   aligning each image frame in the video sequence to a previously processed image frame of the plurality of video image frames;
   filtering each image frame In the video sequence to normalize values of the features In the plurality of video image frames in the video sequence;
   generating a histogram for each image region over the a plurality of image frames in the sequence, including, for each region In each image frame in the video sequence, the steps of:
      determining the feature values for the region in the image frame;
      determining if the features in the region are obscured;
      if the features in the region are not obscured in the image frame, incrementing cells of a histogram corresponding to the determined feature values;
      calculating, at each image region, a mode value as indicated by the histogram;
      replacing each image region by its mode value to produce an image of the estimated feature values of the sequence of images.

11. A method according to claim 10, wherein the step of determining if the features in the region are obscured includes the step of detecting motion among corresponding regions in the plurality of video image frames to an indication that features are obscured in regions that exhibit motion.

12. A method according to claim 10, wherein the step of generating the histogram recursively filters each image region over the plurality of image frames to generate the histogram.

13. Apparatus which estimates values of features of one or more image regions in a video sequence including a plurality of video image frames when the one or more of the features are obscured by objects over portions of the video sequence, the apparatus comprising:
   a source of input images;
   a histogram memory to store a histogram for each image region over the plurality of image frames in the sequence;
   a histogram processor which;
   recursively filters the input images to generate the histogram for each image region over the plurality of image frames in the sequence; and
   calculates a mode value at each image region, as indicated by the histogram to provide an image of the estimated feature values of the sequence of images.

14. Apparatus according to claim 13, wherein the histogram processor includes a recursive filter.

15. Apparatus according to claim 13, wherein the histogram processor includes an image alignment process that spatially aligns the images in the video sequence before generating the histogram.

16. Apparatus according to claim 15, further comprising a filter which filters each image frame in the video sequence before generating the histogram.

17. A carrier including computer instructions that cause a computer to estimate feature values of one or more image regions in a video sequence including a plurality of video image frames when the one or more of the features are obscured by objects over portions or the video sequence, the computer instructions causing the computer to perform the steps of:
   generating a histogram for each image region over the plurality of video image frames in the video sequence;
   exduding, from the histogram generating step, regions of the plurality of images in which there is a prior indication that the features are obscured;
   calculating at each image region a mode value as indicated by the histogram; and
   replacing each image region by its mode value to produce an image of the estimated feature values of the sequence of images.

18. A carrier according to claim 17, wherein the computer instructions that cause the computer to exclude regions of the plurality of images in which there is a prior indication that the features are obscured, further cause the computer to detect motion among corresponding regions in the plurality of video image frames to provide the prior indication that the features are obscured.

19. A carrier including a computer instructions that cause a computer to estimate values of features of one or more image regions in a video sequence including a plurality of video image frames when the one or more of the features are obscured by objects over portions of the video sequence, the computer instructions causing the computer to perform the steps of:
   generating a histogram for each image region over the plurality of image frames in the sequence by recursively filtering each image region over the plurality of image frames to generate the histogram;
   calculating at each image region a mode value as indicated by the histogram; and
   replacing each image region by its mode value to produce an image of the estimated feature values of the sequence of images.

20. A carrier according to claim 19, further including instructions that cause the computer to align the images in the video sequence before the instructions that cause the computer to generate the histogram.

21. A carrier according to claim 19, further including Instructions that cause the computer to filter each image frame in the video sequence before the instructions that cause the computer to generate the histogram.

* * * * *